United States Patent
Ahn

(10) Patent No.: US 9,262,028 B2
(45) Date of Patent: Feb. 16, 2016

(54) METHOD FOR CORRECTING COORDINATES OF PORTABLE ELECTRONIC DEVICE USING ELECTRONIC PEN

(71) Applicant: Samsung Electronics Co., Ltd., Suwon-si, Gyeonggi-do (KR)

(72) Inventor: Heetae Ahn, Pohang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 14/278,492

(22) Filed: May 15, 2014

(65) Prior Publication Data

US 2014/0354589 A1    Dec. 4, 2014

(30) Foreign Application Priority Data

Jun. 4, 2013    (KR) ......................... 10-2013-0063942

(51) Int. Cl.
  G06F 3/033    (2013.01)
  G06F 3/044    (2006.01)
  G06F 3/041    (2006.01)
  G06F 3/0354    (2013.01)

(52) U.S. Cl.
  CPC ............ *G06F 3/044* (2013.01); *G06F 3/03545* (2013.01); *G06F 3/0416* (2013.01); *G06F 3/0418* (2013.01)

(58) Field of Classification Search
  None
  See application file for complete search history.

(56) References Cited

U.S. PATENT DOCUMENTS

| 4,577,057 A | 3/1986 | Blesser |
| 4,878,553 A | 11/1989 | Yamanami et al. |
| 2012/0037433 A1 | 2/2012 | Yeh et al. |
| 2012/0206419 A1 | 8/2012 | Lee et al. |
| 2013/0082976 A1 | 4/2013 | Kang |
| 2014/0253463 A1* | 9/2014 | Hicks .................. G06F 3/03545 345/173 |

FOREIGN PATENT DOCUMENTS

| EP | 2 575 013 A2 | 4/2013 |
| JP | 2006-302029 A | 11/2006 |
| JP | 2011-164746 A | 8/2011 |

* cited by examiner

*Primary Examiner* — Adam R Giesy
(74) *Attorney, Agent, or Firm* — Jefferson IP Law, LLP

(57) ABSTRACT

A method for correcting coordinates of an electronic pen having a pen contact and a coil which are spaced apart by a predetermined distance and an electronic pen by using a portable electronic device is provided. The method includes calculating a coordinate correction angle, calculating a coordinate correction distance from an electromagnetic induction point on a display unit of the portable electronic device, on which an electromagnetic field generated by electromagnetic induction between the coil and a sensor board of the portable electronic device is measured, to a contact point of the pen contact with respect to the display unit, and determining a coordinate of the electronic based on the calculated coordinate correction angle and the calculated correction distance.

17 Claims, 8 Drawing Sheets

⟨601⟩

⟨602⟩

METHOD FOR CORRECTING COORDINATES OF PORTABLE ELECTRONIC DEVICE USING ELECTRONIC PEN

CROSS-REFERENCE TO RELATED APPLICATION(S)

This application claims the benefit under 35 U.S.C. §119 (a) of a Korean patent application filed on Jun. 4, 2013 in the Korean Intellectual Property Office and assigned Serial number 10-2013-0063942, the entire disclosure of which is hereby incorporated by reference.

TECHNICAL FIELD

The present disclosure relates to a method for correcting a coordinate of an electronic pen. More particularly, the present disclosure relates to a method for correcting a coordinate of an electronic pen which is supported to correct errors generated when the electronic pen operated by electromagnetic induction contacts a portable electronic device by using at least one among face recognition, touch hovering, and a palm touch, and a portable electronic device supporting the same.

BACKGROUND

Portable electronic devices have been increasingly used in fields of industry and lifestyle due to supporting particular user functions and having a size small enough to carry. Recently, new portable electronic devices have been developed which integrally support diverse user functions. The portable electronic devices support user functions and provide a screen corresponding to a corresponding user function through the display unit. Accordingly, the user views the screen output on the display unit when using the specific user function and uses the corresponding function.

Portable electronic devices of the related art support a function of writing text, drawing pictures, and the like by using an electronic pen operated by electromagnetic induction. The electronic pen detects a specific input signal from the portable electronic device while contacting with the display unit. Accordingly, the user may perform a function of writing and the like on the display unit of the portable electronic device by operating the electronic pen. Since angles formed by the user's grasp of the electronic pen may be different from each other, errors between a point where an actual electronic pen is contacted with the display unit and a point where the electronic pen which is recognized by the portable electronic device are generated. To correct the errors, the related art employs a table with previously defined eight coordinate correction values of an electronic pen, in which there are two forms including a left-handed standard angle (hereinafter, referred to as "a grip angle of the left-hand") and a right-handed standard angle (hereinafter, referred to as "a grip angle of the right-hand") according to a form of the pen grip of the user, and four forms including a form of forward/reverse or a transverse/longitudinal direction according to the arrangement state of the portable electronic device on the basis of the front side of the user who grasps the portable electronic device. A coordinate of the electromagnetic induction point formed by the electronic pen is corrected as a coordinate of the point that is formed by the contact of the electronic pen with the display unit by using a table storing the previously defined grip angle and the previously defined error correction distance (hereinafter, referred to as "a standard inclination correction distance"). The grip angle of the left-hand, the grip angle of the right-hand, and the standard inclination correction distance are numeric values defined previously by statistics or experiments.

However, this method of solving problems arising in the related art could be properly applied only to a case where the portable electronic device was inclined to the ground by greater than or equal to a predetermined angle and it was not possible to correct the coordinate of the electronic pen accurately because the arrangement state of the portable electronic device could not be recognized smoothly when the portable electronic device was laid horizontal to the ground. As a result, inconveniences are produced because the arrangement state of the portable electronic device cannot be confirmed as it is necessary to identify the arrangement state of the portable electronic device by inclining the portable electronic device laid in a horizontal state by a predetermined angle and then converting the portable electronic device into the horizontal state again.

In addition, when the user inputs signals by the electronic pen while the arrangement state of the portable electronic device is not accurately recognized, errors may increase because of the use of the pre-defined correction angle and correction distance values, which are not consistent with the arrangement state of the portable electronic device.

Furthermore, the related art has a limitation in that various errors, generated according to the changed rotation state of the portable electronic device by providing only whole eight coordinate correction values, cannot be reflected and the identical standard inclination distance is applied even though the inclination angle of the electronic pen is changed when the user writes text.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for correcting a coordinate of an electronic pen which supports to correct errors generated when the electronic pen, operated by electromagnetic induction, is contacted with a portable electronic device by using at least one among a face recognition, a touch hovering and a palm touch, and the portable electronic device supporting the same.

In accordance with an aspect of the present disclosure, a method for correcting coordinates of a portable electronic device using an electronic pen is provided, The method includes calculating a coordinate correction angle, calculating a coordinate correction distance from an electromagnetic induction point on a display unit of the portable electronic device, on which an electromagnetic field generated by electromagnetic induction between the coil and a sensor board of the portable electronic device is measured, to a contact point that the electronic pen contacts with the display unit, and determining a coordinate of the electronic pen based on the calculated coordinate correction angle and the calculated coordinate correction distance. The calculating of the coordinate correction angle comprise at least one of calculating the coordinate correction angle based on an inclination angle of the portable electronic device to the right or left on the basis of a front side of the user based on a user face image and the electromagnetic induction point, calculating the coordinate correction angle based on a point corresponding to a touch hovering input generated by hovering of a user's hand on the display unit and the electromagnetic induction point, and calculating the coordinate correction angle based on a point corresponding to a palm touch input generated by a palm touch of the user on the display unit and the electromagnetic induction point.

In accordance with another aspect of the present disclosure, a portable electronic device is provided. The portable electronic device includes a sensor board configured to receive a touch hovering input and a touch input from an electronic pen, a display unit configured to receive a touch hovering input generated by a hovering of a user's hand and a palm touch input generated by a palm touch of the user, a camera configured to photograph a user's face, and a controller configured to calculate a coordinate correction distance from an electromagnetic induction point on a display unit, on which an electromagnetic field generated by electromagnetic induction between the coil and the sensor board is measured, to a contact point that the electronic pen contacts with the display unit and to calculate a coordinate correction angle, to determine a coordinate of the electronic pen based on the coordinate correction angle and the calculated coordinate correction distance, and to control the calculation of the coordinate correction angle according to at least one of calculating the coordinate correction angle based on an inclination angle of the portable electronic device to the right or left on the basis of a front side of the user based on a user face image and the electromagnetic induction point, calculating the coordinate correction angle based on a point corresponding to a touch hovering input generated by hovering of a user's hand on the display unit and the electromagnetic induction point, and calculating the coordinate correction angle based on a point corresponding to a palm touch input generated by a palm touch of the user on the display unit and the electromagnetic induction point.

As described above, according to an aspect of the present disclosure, a method for correcting a coordinate of an electronic pen and a portable electronic device which supports the same enables calculation of an accurate input coordinate by an electronic pen so that excellent usability may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Herein, an electronic device according to an embodiment of the present disclosure may include information communication devices and multimedia devices, and applications thereof, such as a Portable Multimedia Player (PMP), a digital broadcasting player, a Personal Digital Assistant (PDA), a music player (for instance, MP3 player), a portable game terminal, a smart phone, a notebook, and a handheld Personal Computer (PC), and the like, in addition to all mobile communication terminals operated based on communication protocols corresponding to diverse communication systems.

In describing the various embodiments of the present disclosure, descriptions related to technical content which is well-known in the art to which the present disclosure pertains, and are not directly associated with the present disclosure, will be omitted. Moreover, detailed descriptions related to configuration elements having substantially identical configurations and functions will be omitted.

Also, in the accompanying drawings, some elements are exaggerated, omitted, or schematically illustrated, and the size of each element does not entirely reflect an actual size. Accordingly, the inventive concept is not limited to relative sizes or distances drawn in the accompanying drawings.

Figure 1:
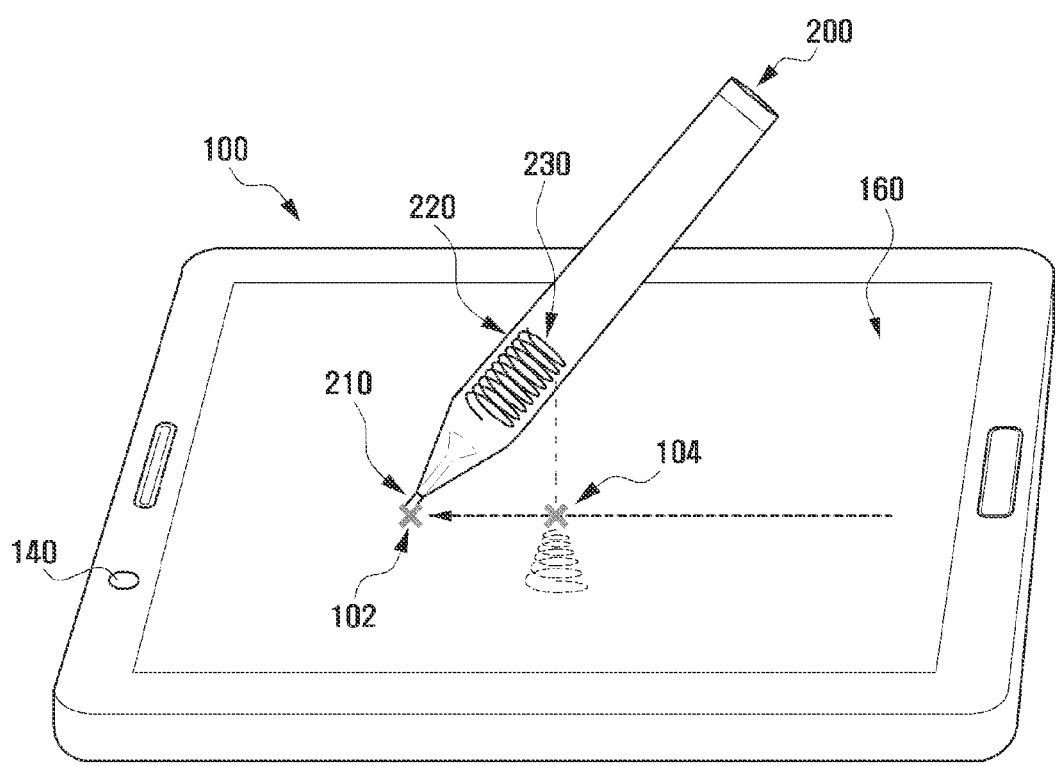
FIG. 1 is a view illustrating a configuration of an electronic pen and a portable electronic device according to an embodiment of the present disclosure.

FIG. 1 is a view illustrating a configuration of an electronic pen and a portable electronic device according to an embodiment of the present disclosure.

Referring to FIG. 1, an electronic pen 200 is supported to generate a specific input signal in a portable electronic device 100. According to an embodiment of the present disclosure, when the electronic pen 200, which generates an input signal through electromagnetic induction, generates input signals by cooperating with the portable electronic device 100, the electronic device 100 may correct errors according to an arrangement state of the portable electronic device 100, an angle change according to rotation of the electronic device 100, and an inclination of the electronic pen 200, by using at least one among a face recognition, a touch hovering, and a palm touch. The touch hovering is different from the hovering state of the electronic pen 200, and refers to a state in which a hand of a user is positioned at a predetermined distance until making contact with a display unit 160 when the user grasps the electronic pen 200 and writes or performs other actions. The palm touch refers to a state in which a user's palm forms a predetermined area and makes contact with the display unit 160. According to an embodiment of the present disclosure, when a specific signal has been received according to the use of the electronic pen 200, the portable electronic device 100 may output graphic elements according to a corresponding input signal at a point of the display unit 160 where the electronic pen 200 is contacted.

As shown in FIG. 1, the electronic pen 200 includes a penholder 220, a pen contact 210, and a coil 230 for the electromagnetic induction which may be arranged on the inside of the penholder 220, which is at an area adjacent to the pen contact 210. The penholder 220 has a desired length and may have a hollow cylindrical shape. A front end of the penholder 220 may have a conical shape, and a point of the front end is provided with a through hole for the pen contact 210 to be disposed therein. The pen contact 210 may have a shape in which a portion disposed at the inside of the front end of the penholder 220 is connected to a portion passing through the through-hole of a point end. The pen contact 210 may have a shape that is formed to be pushed to the rear side from the front end of the penholder 220 when the pen contact 210 is contacted with a specific object by an elastic member in order to provide a feeling of using the actual electronic pen 200. Thereafter, when the contact with the special object is released, the pen contact 210 may be returned to its original position by an elastic member. A portion disposed on the inside of the front end of the pen contact 210 may be arranged to have a structure that contacts with the coil 230 positioned on the inside of the penholder 220 in a process of being pushed to the rear, while it is supported by the elastic member. The pen contact 210 may have a contact point 102 when contacting with the display unit 160 of the portable electronic device 100.

The coil 230 is disposed at a predetermined area on the inside of the hollow cylindrical penholder 220 which is internally empty and spaced apart from the pen contact 210 by a predetermined distance, and induces electromagnetism on a sensor board included in the portable electronic device 100. Accordingly, the coil 230 may operate to induce electromagnetism on the sensor board included in the portable electronic device 100 and thereby form an electromagnetic induction point. The coil 230 may be disposed on a slant from the front side of the penholder 220, and as described above, may be disposed to make contact with a predetermined portion of the pen contact 210 along with a movement of the pen contact 210. A shape, a length, a volume, or the like of the coil 230 may be determined based on a specific state, but these features may be defined differently by a size of the electronic pen 200, a quality of the sensor board applied to the portable electronic device 100, amount of electric current applied to the portable electronic device 100, and the like. Accordingly, a structure of the electronic pen 200 need not be defined to the shape of the pen contact 210 as described and shown above or to the shape of the penholder 220 or the size or the position of the coil 230, and the like, but may be determined by an experimental shape forming electromagnetic induction in the course of cooperation with the sensor board, which is disposed on the portable electronic device 100.

The portable electronic device 100 may include a storage unit and a controller for supporting various application programs, and further may include the display unit 160 for outputting graphic elements for operation of the electronic pen 200 according to an embodiment of the present disclosure. The portable electronic device 100 may detect the position of the electronic pen 200 by using the sensor board and correct errors according to a position detection of the electronic pen 200.

The portable electronic device 100 may identify an arrangement state produced from rotation of the portable electronic device 100 through a user's face recognition, and support to make a correction value of different errors, which is applied to the electronic pen 200 according to the arrangement state. The arrangement state of the portable electronic device 100 refers to the portable electronic device 100 being positioned transversely/longitudinally in the forward/reverse direction on the basis of a front side of the user who grasps the portable electronic device along with the rotation of the portable electronic device 100.

For example, if the user is supposed to gaze at the portable electronic device 100 from the front side thereof, the portable electronic device 100 shown in FIG. 1 may be positioned at a transverse state in the forward direction, and if the portable electronic device is arranged to be rotated by 90 degree in the clockwise direction, the portable electronic device 100 may be regarded to be positioned at a longitudinal state in the forward direction. The portable electronic device 100 may identify the transverse/longitudinal state of arrangement of the portable electronic device 100 in the forward/reverse direction, and further calculate a rotation angle of the portable electronic device 100 on the basis of the front side of the user. Accordingly, it is possible to identify an inclination angle of the portable electronic device 100 in the right/left direction from the front side of the user, on the basis of the arrangement state and the rotation angle of the portable electronic device 100.

Moreover, the portable electronic device 100 according to another embodiment of the present disclosure may calculate a coordinate correction angle for correcting the electromagnetic induction point 104 of the electronic pen 200 to a contact point 102 of the electronic pen 200 irrespective of the inclination angle of the portable electronic device 100 in the right/left direction by using the touch hovering and the palm touch. The portable electronic device 100 may calculate a correction angle, irrespective of the arrangement state when a coordinate of the electromagnetic induction point 104 induced when the electronic pen 200 contacts with the display unit 160 and a coordinate input by the touch hovering or the palm touch has been collected. In addition, in case of using the palm touch, the portable electronic device 100 may determine a correction distance by using the coordinate input by the palm touch and the coordinate of the electromagnetic induction point 104.

Figure 2:
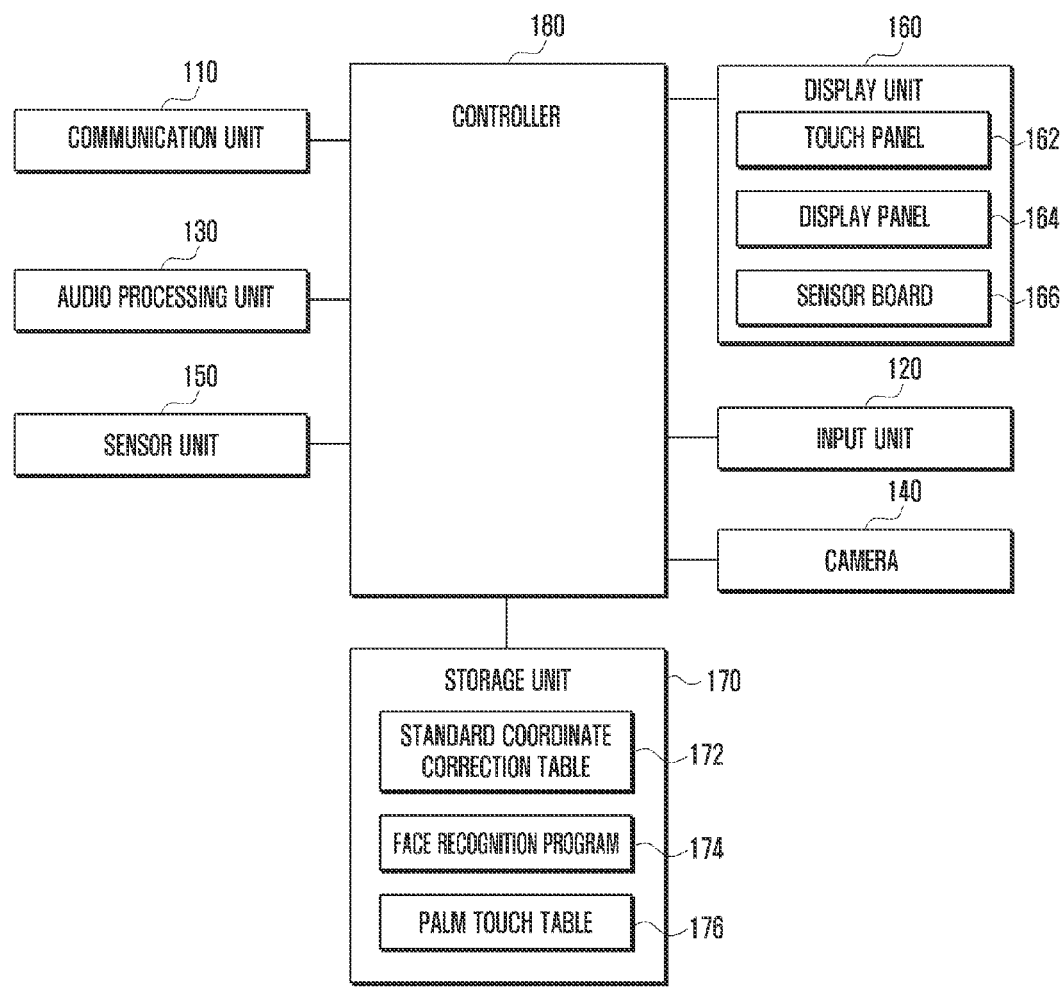
FIG. 2 is a block diagram illustrating a configuration of a portable electronic device according to an embodiment of the present disclosure.

FIG. 2 is a block diagram illustrating a configuration of a portable electronic device according to an embodiment of the present disclosure.

Referring to FIG. 2, the portable electronic device 100 according to an embodiment of the present disclosure may include a communication unit 110, an input unit 120, an audio processing unit 130, a camera 140, a sensor unit 150, a display unit 160, a storage unit 170 and a controller 180.

The communication unit 110 may be added when the portable electronic device 100 supports a communication function, and may be omitted when the portable electronic device 100 does not support the communication function. The communication unit 110 may be activated when an item prepared to support the communication function by using the electronic pen 200 has been selected, and the communication unit 110 may also be activated according to a user's input by using a user's finger other than the electronic pen 200.

The input unit 120 generates various input signals required for the operation of the portable electronic device 100. The input unit 120 may include various input means, such as a keyboard, a keypad, key-button, and the like, according to a possibility of exchange of the portable electronic device 100. The input unit 120 may also be configured with a touch map form output to the touch screen when the display unit 160 is provided as a touch screen. The input unit 120 may generate input signals for activating the operation of the electronic pen 200 or input signals deactivating the operation of the electronic pen 200 according to a user's request. Furthermore, the input unit 120 may produce input signals for converting a left-hand input mode and a right-hand input mode of the electronic pen 200 based on the user's request, and may transmit the input signal to the controller 180.

The audio processing unit 130 may output various audio data configured in an operating process of the portable electronic device 100, audio data according to an audio reproduction file stored in the storage unit 170, and audio data received from outside, and the like. The audio processing unit 130 may support an audio data collecting function. To this end, the audio processing unit 130 may include a speaker and a microphone. When at least one among a face recognition, a touch hovering, and a palm touch of the portable electronic device 100 is used, the audio processing unit 130 may output guiding sounds or effect sounds corresponding thereto. In addition, the audio processing unit 130 may output effect sounds indicating that an input signal by the electronic pen 200 is normally operated in a process of inputting a specific text or image in the display unit 160 of the portable electronic device 100, by using the electronic pen 200.

The camera 140 may collect images including a user's face. The camera 140 may transmit the collected images to the controller 180 in order to calculate a coordinate correction angle required to correct a coordinate 104 of an electromagnetic induction point into a coordinate of the contact point 102 by using the electronic pen 200. The camera 140 may start photographing under a control of the controller 180 when the electronic pen 200 reaches a hovering state. The hovering state of the electronic pen 200 refers to a state where the electronic pen 200 is located at a distance from which the sensor board 166 may detect a signal generated by the electronic pen 200 until a point where the electronic pen 200 contacts the display unit 160. The controller 180 starts photographing the user images in the hovering state of the electronic pen 200 so that the controller 180 may previously confirm an arrangement state and a rotation angle of the portable electronic device 100 before the signal by the electronic pen 200 is input. Thus, a reaction speed of the graphic elements output according to the signal input of the electronic pen 200 may increase. However, the present disclosure is not limited to this embodiment, and the camera 140 according to the embodiment of the present disclosure may achieve an identical object even though the photographing is started after the input by the electronic pen 200.

The controller 180 may recognize the user's face from images including the user's face and extract specific coordinate of an eye, a nose, a face shape, and the like of the user, as feature points of the user, from the recognized user face. The controller 180 according to the embodiment of the present disclosure may confirm a angle in which the portable electronic device 100 inclines in the right and left directions on the basis of a front of user by using coordinates of the two eyes of the user, which are extracted as specific coordinates, and then calculate coordinate correction angles by using the obtained result.

The sensor unit 150 collects sensor information for supporting a rotation function of the portable electronic device 100. The sensor unit 150 may be configured as a sensor which may detect rotation of the terminal, such as an acceleration sensor, and the like. Accordingly, the sensor unit 150 generates sensor information when the portable electronic device 100 is arranged in a specific direction, or when a conversion of direction occurs while the portable electronic device 100 is arranged in the specific direction. The generated sensor information is transmitted to the controller 180 and may be used as data determining the arrangement state of the portable electronic device 100. The sensor unit 150 may include at least one among various sensors, such as an acceleration sensor, a geomagnetism sensor, a gyro sensor, and the like. The sensor unit 150 may be activated when a specific user function is activated and detect the rotation of the portable electronic device 100. When an input signal for activating a pen function is generated, the sensor unit 150 may be activated together with the generated input signal, generate sensor information according to the rotation detection of the portable electronic device 100, and transmit the sensor information to the controller 180. According to other embodiments of the present disclosure, the sensor unit 150 may be omitted. When there is at least one input among a user image input photographed by the camera 140, a touch hovering input, and a palm input, according to an embodiment of the present disclosure, errors according to input of the electronic pen 200 may be corrected so that the sensor unit 150 may be omitted.

The display unit 160 provides various pictures required for an operation of the portable electronic device 100. For example, the display unit 160 supports a standby screen, a menu screen, and the like, which are required for the operation of the portable electronic device 100. The display unit 160 may differently display a screen direction according to the rotation of the portable electronic device 100 of the user.

The display unit 160 may support a configuration screen which may determine whether the coordinate correction of the electronic pen 200 according to an embodiment of the present disclosure is applied. For example, the display unit 160 may provide a configuration window which may configure a mode using the user image photographed by the camera 140, a mode using the touch hovering input and a mode using the palm touch input as a method for correcting coordinates of the electronic pen 200. In this event, the mode using the user image photographed by the camera 140, the mode using the touch hovering input, and the mode using the palm touch input may be configured to be overlapped under the control of the controller 180 and may be configured to have a different priority from each other when those modes are configured to be overlapped. For example, the controller 180 may configure the mode for using the palm touch, the mode for using the touch hovering, the mode for using the user image in sequence.

The display unit 160 may include a display panel 164, a touch panel 162, and a sensor board 166. The touch panel 162 may be formed in a full touch screen by being configured to cover a front side of the display panel 164. The display panel 164 may output a screen in a predetermined direction according to the operation of the user function and is supported so as to provide a screen in a transverse mode or a longitudinal mode in a specific direction according to the rotation or continuously maintain a screen state in a specific mode. The display panel 164 may output an input of a coordinate corrected based on the coordinate correction angles and coordinate correction distances calculated by the controller.

The touch panel 162 may transmit a touch event according to the contact together with position information, a touch degree and period information to the controller 180. The touch panel 162 supports a function that may select specific configuration elements output to the screen by being matched with the screen configuration elements output to the display panel 164. In particular, the touch panel 162 may receive the touch hovering input and the palm touch input in order to correct the coordinate of the electronic pen 200.

The touch panel 162 may receive a touch hovering input generated by a hand of the user who grasps the electronic pen 200 and transmit the touch hovering input to the controller 180. The controller 180 may confirm the coordinate of the touch hovering input based on the transmitted touch hovering input. When the touch hovering input is input through a plurality of coordinates, the controller 180 may determine the coordinate of the touch hovering input by comparing the hovering intensity. The controller 180 may calculate the coordinate correction angles by using the coordinate of the calculated touch hovering input and the coordinate of the electromagnetic induction point 104.

The touch panel 162 may also receive a palm touch input of the user who grasps the electronic pen 200. The touch panel 162 may transmit the received palm touch input to the controller 180. The controller 180 may calculate a center point of the palm touch input among a plurality of points based on the palm touch input. A formula for calculating the center point of the palm touch input may include calculating coordinates obtained by averaging vector values of the points corresponding to an outline of a palm touch area among coordinates of the points configured in an area formed by the palm touch, as the center point. However, the formula for calculating the center point is merely illustrative; embodiments of the present disclosure are not limited to this formula, and various center point calculating formulae may be applied. For example, according to a scheme for implementing the touch panel 162, it is also possible to measure a size of pressure by a contact in the area of palm touch or an intensity of the electrostatic capacity variation and calculate a point where the measured size or intensity is biggest as a center point. The controller 180 may calculate the coordinate correction angles by using coordinates of a center point of the calculated palm touch input and coordinates of the electromagnetic induction point 104 of the electronic pen 200. The controller 180 may utilize a distance between the center point of the palm touch and the electromagnetic induction point 104 of the electronic pen 200 to determine a coordinate correction distance so as to correct distance errors according to inclination of the electronic pen 200.

The sensor board 166 is arranged below the display panel 164 and supports an electromagnetic induction by a coil 230 included in the electronic pen 200. In this event, the sensor board 166 may supply a predetermined electric voltage or electric current to the front side of the board according to the control of the controller 180 to detect the electromagnetic induction of the coil 230 and the induced electromagnetism. When the portable electronic device 100 supports a full-touch, the sensor board 166 may have a size corresponding to the whole display panel 164. In addition, when only a touch function for a predetermined portion is supported, the sensor board 166 may have a size smaller than the size of the display panel 164. According to an embodiment of the present disclosure, the sensor board 166 may generate a signal and transmit the signal to the controller 180 when the electronic pen 200 approaches the portable electronic device 100 and reaches a distance by which the hovering may be detected. The controller 180 may control the camera 140 to be activated in order to photograph the user.

The storage unit 170 is a secondary memory unit of the controller 180, and may include a disc, a RAM, and a flash memory. The storage unit 170 may store data generated from the portable electronic device 100 under the control of the controller 180 or received from an outer device, such as a server, a desktop Personal Computer (PC), and the like, through the communication unit 110 or an external interface unit (not shown). The storage unit 170 may include a standard coordinate correction table 172, a face recognition program 174, and a palm touch table 176.

The standard coordinate correction table 172 may store values such as a grip angle of the left-hand, a grip angle of the right-hand, a standard inclination correction distance, and the like, which are defined for the coordinate correction of the electronic pen 200. The grip angle of the left-hand, the grip angle of the right-hand, and the standard inclination correction distance may be generally determined as values obtained through statistics and may be set by a designer or a user at the time of the design. According to an embodiment of the present disclosure, the controller 180 may identify the inclination angle of the portable electronic device 100 in the right and left directions through face recognition, and calculate a coordinate correction angle by adding or subtracting the grip angle of the left-hand or the grip angle of the right-hand together with the inclination angle of the portable electronic device 100 in the right and left directions. The controller 180 may also determine the correction coordinate, which is a coordinate for correcting from the electromagnetic induction point 104 to the contact point 102 of the electronic pen 200, by using the standard inclination correction distance when the coordinate correction angle has been calculated.

According to embodiments of the present disclosure, the face recognition program 174 may generate the coordinate correction angle by using the photographed user image. The face recognition system 174 may recognize a face of the user included in the image photographed by the camera 140 and extract a specific coordinate of an eye or a nose or the like from the recognized face. The face recognition program 174 may extract coordinates for two eyes of the user as a feature point. The controller 180 may receive the coordinates of two eyes of the user, which are extracted from the face recognition program 174, and calculate a rotation angle of the portable electronic device 100 from the received coordinates of two eyes of the user. The controller 180 may identify an arrangement state of the portable electronic device 100 from the recognized face of the user. The controller 180 may calculate a coordinate correction angle by using the inclination angle of the portable electronic device 100, which includes the calculated arrangement state and rotation angle of the portable electronic device 100, in right and left directions.

A palm touch table 176 is a table in which a coordinate correction distance has been previously defined to correct distance errors according to the inclination angle of the electronic pen 200. The inclination angle of the electronic pen 200 may be continuously changed as the user takes notes on the display unit 160 by using the electronic pen 200. The controller 180 may correct coordinates by reflecting the inclination angles of the electronic pen 200, which is continuously changed, by using the palm input of the user (i.e., the palm touch input), with respect to the display unit 160 by means of the palm touch table 176. When the electronic pen 200 contacts the display unit 160, when the palm touch is input to the touch panel 162, the touch panel 162 may transmit the palm touch input to the controller 180. The controller 180 may confirm coordinates of a center point of the palm touch input based on the received palm touch input. The controller 180 may calculate a distance between a coordinate of a contact point according to a contact of the electronic pen 200 with the display unit 160 and a coordinate of the identified center point. The controller 180 may determine a coordinate correction distance of the electronic pen 200 through the palm touch table 176 in which a distance corresponding to a distance between the coordinate of the calculated contact point and the coordinate of the center point is previously defined.

The storage unit 170 may also store an Operating System (OS) for operating the portable electronic device 100; an application program required for other optional functions, such as a sound reproduction function, an image or video reproduction function, a broadcast reproduction function, and the like; user data; data transmitted and received at the time of the communication; and the like. The storage unit 170 may store a coordinate correction program of the electronic pen 200. For example, the coordinate correction program of the electronic pen 200 may include a routine in which, when an input of the face image of the user is received, a coordinate correction angle is produced by using an eye coordinate extracted from the received face image of the user; a routine in which, when the touch hovering input is received, a coordinate correction angle is calculated by using the coordinate of the electromagnetic induction point 104 of the electronic pen 200 and the coordinate of the touch hovering input; and a routine in which, when the palm touch input is received, a coordinate correction angle and a coordinate correction distance is calculated by using the coordinate of the electromagnetic induction point 104 of the electronic pen 200, and the coordinate of the palm touch input.

The controller 180 may control general operations of the portable electronic device 100 and a signal flow between internal elements and perform a function of processing the data. The controller 180 may control power to be supplied from a battery to the internal elements. When the electronic pen 200 generates the input signal in cooperation with the portable electronic device 100, the controller 180 may control the coordinate of the electromagnetic induction point 104 of the electronic pen 200 to be corrected by using at least one among the face recognition, the touch hovering and the palm touch. The controller 180 may control to overlappingly use the face recognition, the touch hovering, and the palm touch, or use the face recognition, touch hovering, and palm touch based on corresponding priorities. In this event, the controller 180 may set the palm touch, the touch hovering, and the face recognition in sequence. However, the priority preference is only an illustrative example, and does not limit a technical idea of the present disclosure.

Figure 3:
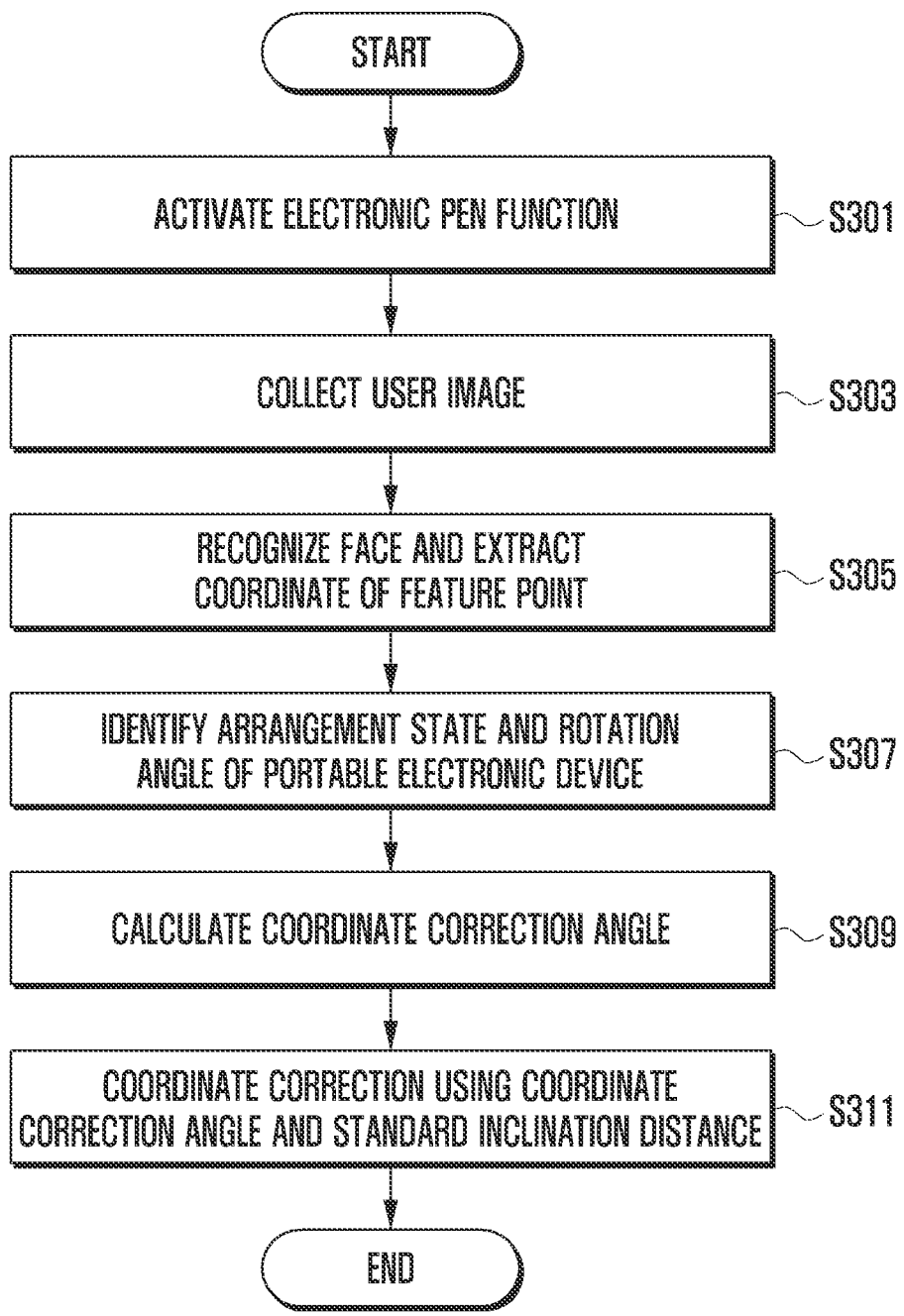
FIG. 3 is a flowchart illustrating a method for correcting a coordinate of an electronic pen using face recognition according to an embodiment of the present disclosure.
Figure 4:
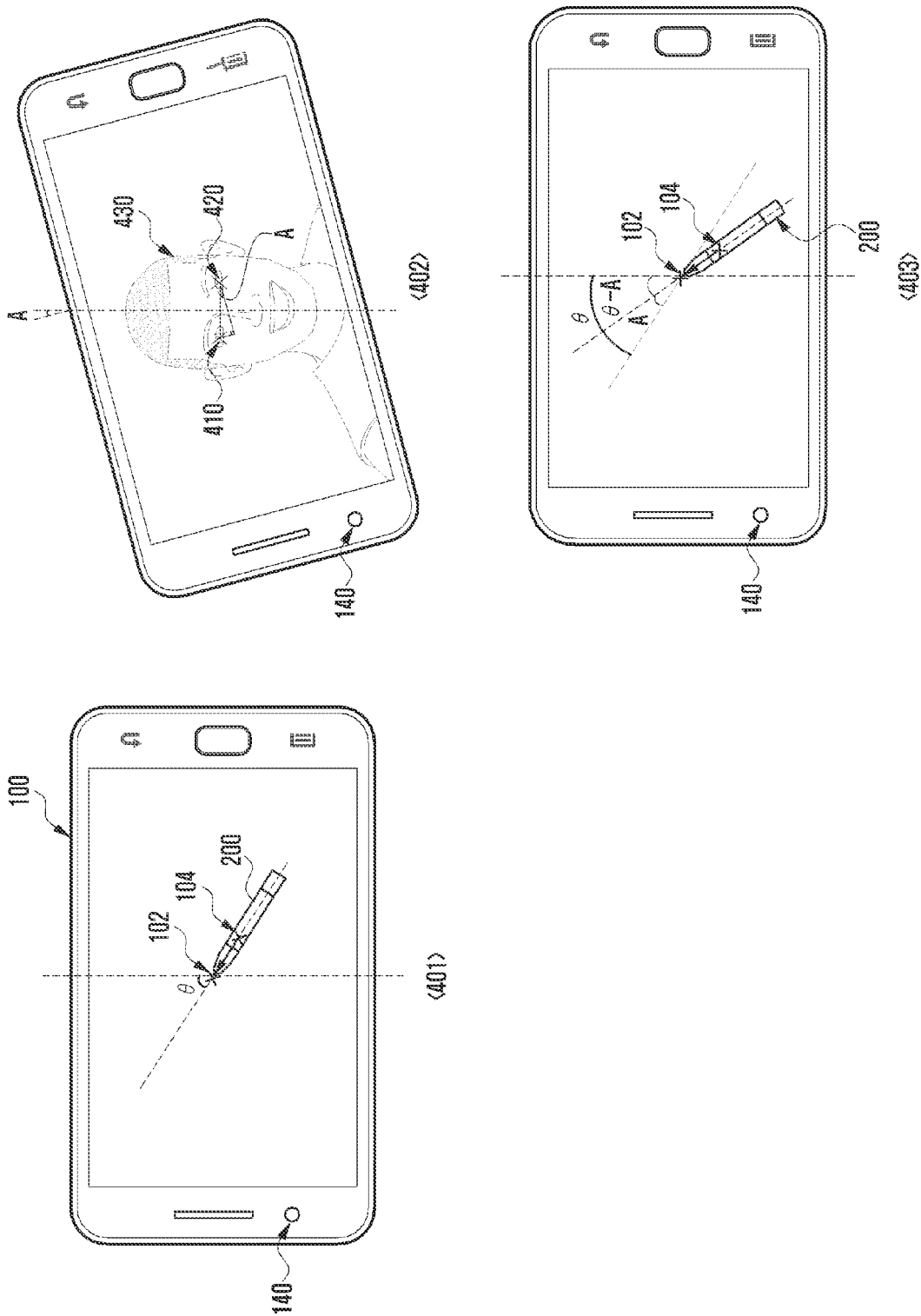
FIG. 4 is a view illustrating a method for correcting a coordinate of an electronic pen using face recognition according to an embodiment of the present disclosure.

FIG. 3 is a flowchart illustrating a method for correcting a coordinate of an electronic pen using face recognition according to an embodiment of the present disclosure and FIG. 4 is a view illustrating a method for correcting a coordinate of an electronic pen using face recognition according to an embodiment of the present disclosure.

Referring to FIGS. 3 and 4, in operation S301, the controller 180 activates a function of the electronic pen 200. The controller 180 controls each element of the portable electronic device 100 to perform a user function by using the supplied power, receives a function activation signal of the electronic pen 200 from the input unit 120, and the like, and activates the function of the electronic pen 200.

In operation S303, the controller 180 receives the user's image photographed by the camera 140. When the hovering state of the electronic pen 200 is detected, the controller 180 may control to start photographing the user by activating the camera 140. The hovering state of the electronic pen 200 refers to a state in which a signal generated by the electronic pen 200 is located at a distance from a point at which the sensor board 166 may detect a signal generated by the electronic pen 200 until a point where the electronic pen 200 contacts the display unit 160. It may be defined that the controller 180 is in the hovering state of the electronic pen 200 in only a case where a signal which is greater than or equal to a predetermined level is received from the sensor board. Accordingly, the controller 180 starts photographing when detecting a hovering state of the electronic pen 200 so that a reaction velocity of a signal output of the electronic pen 200 may increase. However, the scope of the technical idea of the present disclosure is not limited thereto, and the camera 140 may achieve an identical object while starting photographing after the input by the electronic pen 200.

In operation S305, the controller 180 recognizes a face from the received user image and extracts a feature point. The controller 180 may recognize a user face by using the face recognition program 174 included in the user image. The controller 180 may extract a coordinate of the feature point from the recognized face. The feature point may include an eye, a nose, or the like of the recognized face. However, the scope of exemplary embodiments of the present disclosure is not limited thereto. Accordingly, embodiments of the present disclosure may include other face portions to be recognized, such as a lip, a face shape, or the like, other than the eye or the nose of the recognized face and may recognize an angle of a face. In particular, the controller 180 may use coordinates of two eyes of the user as the coordinate of a feature point.

In some cases, the controller 180 does not recognize the user face from a collected image. For example, when the user face is not photographed or a part of the user face is only photographed within a scope of the photographing of the cameral 40, the controller 180 may not recognize the user face. In this event, the controller 180 may control to limit a number of photographs of the user image within a predetermined number and to correct the errors of the electronic pen 200 by using the grip angle θ of the right-hand or the left-hand and the standard inclination distance when the user face is not recognized within a predetermined time.

In operation S307, the controller 180 identifies the inclination angle of the portable electronic device 100 in the right and left directions, including an arrangement state and a rotation angle of the portable electronic device 100 by using extracted coordinates 410 and 420 of the two eyes and the recognized user face. Referring to FIG. 4, a reference numeral 401 illustrates a state wherein the portable electronic device 100 is arranged in a forward directional transverse mode on the basis of a front side of the user. According to the related art, in reference numeral 401, when the portable electronic device 100 is in an inclined state by a predetermined angle with respect to the ground, the portable electronic device 100 may be identified as being in the forward directional transverse mode through an acceleration sensor, a geomagnetism sensor, and a gyro sensor, and the like included in the sensor unit 150. However, when the portable electronic device 100 is laid horizontal to the ground, the arrangement state of the portable electronic device 100 may not be identified. Accordingly, when the controller 180 recognizes the arrangement state of the portable electronic device 100 to be in a different mode from the forward directional transverse mode and applies the grip angle θ of the right-hand as a coordinate correction angle of the electronic pen 200, errors become larger.

According to an embodiment of the present disclosure, reference numeral 402 illustrates that the portable electronic device 100 is rotated at a predetermined angle A in order to calculate the coordinate correction angle of the electronic pen 200 by using the coordinates 410 and 420 of the two eyes from the image 430 including the user face. While the coordinates of the two eyes of the user do not change on the basis of the front side of the user according to the rotation of the portable electronic device 100, a coordinate on the display unit 160 of the portable electronic device 100 may be changed. In reference numeral 402, the image 430 including the user face shown by a dotted line does not output actually on the display unit 160. The controller 180 may identify the arrangement state of the portable electronic device 100 by recognizing the user face. The controller 180 may recognize the arrangement state of the portable electronic device 100 as the forward directional transverse mode in reference numeral 402 through two eyes, a nose, a face portion, a lip, and the like recognized from the user face. Further, the controller 180 may identify the extracted coordinates 410 and 420 of the two eyes of the user so that the rotation angle of the portable electronic device 100 may be identified. In reference numeral 402, the controller 180 may identify a rotation angle A of the portable electronic device 100 on the basis of the front side of the user by using a distance between the coordinates of two eyes of the user and a distance between the coordinates 410 and 420 of two eyes of the user with respect to a transverse axis and a longitudinal axis of the portable electronic device 100.

In operation S309, the controller 180 may calculate a correction angle of the electronic pen 200 based on the arrangement state and the rotation angle of the portable electronic device 100. Reference numeral 403 is a view showing the portable electronic device 100 rotated by a predetermined angle A on the basis of the coordinate of the portable electronic device 100 for convenience of description. As shown in reference numeral 403, the forward directional transverse mode may be a standard of the coordinate of the portable electronic device 100. In reference numeral 403, since the portable electronic device 100 has been rotated to the left by "A", the controller 180 may calculate the coordinate correction angle of the electronic pen 200 in the forward directional transverse mode of the portable electronic device 100 as an angle θ−A obtained by subtracting the rotation angle A of the portable electronic device 100 from the grip angle θ of the right-hand.

In operation S311, the controller 180 may correct the coordinate of the electronic pen 200 by applying the calculated coordinate correction angle and the standard inclination distance as a coordinate correction distance.

Figure 5:
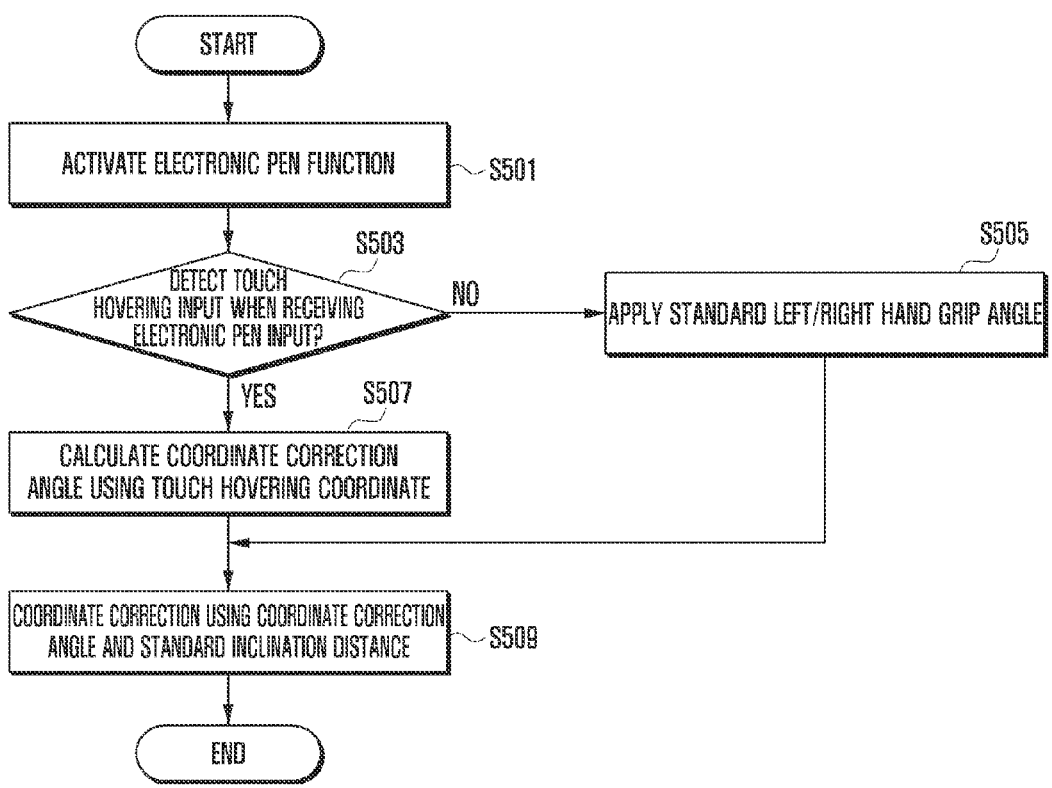
FIG. 5 is a flowchart illustrating a method for correcting a coordinate of an electronic pen using a touch hovering according to another embodiment of the present disclosure.
Figure 6:
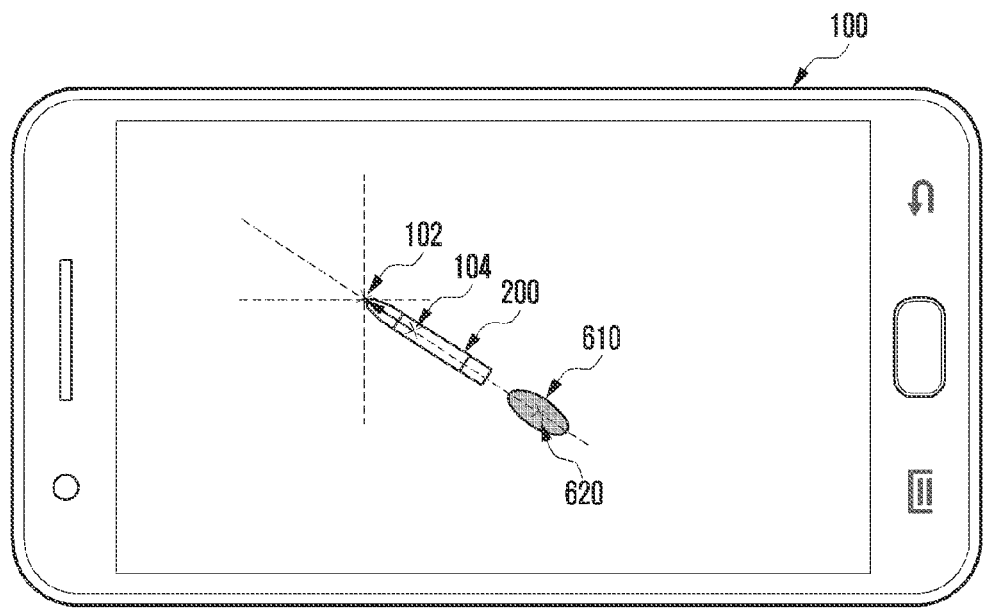
FIG. 6 is a view illustrating a method for correcting a coordinate of an electronic pen using a touch hovering according to another embodiment of the present disclosure.
Figure 6:
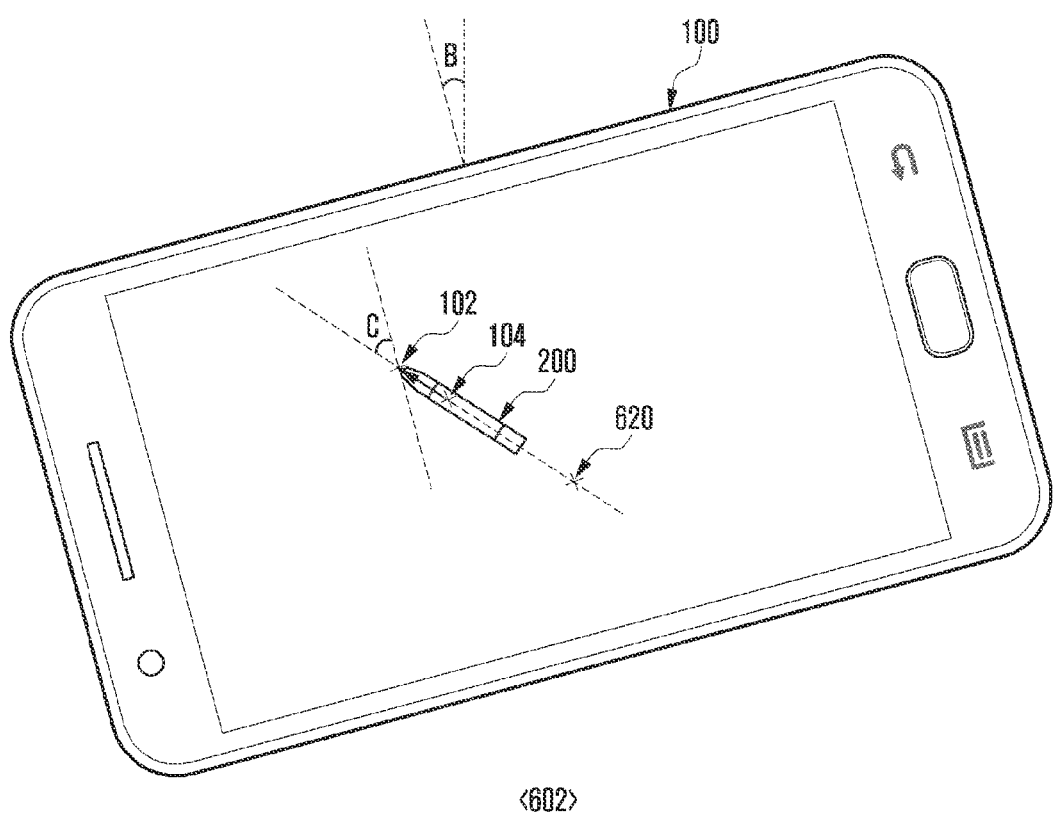

FIG. 5 is a flowchart illustrating a method for correcting a coordinate of an electronic pen using a touch hovering according to another embodiment of the present disclosure and FIG. 6 is a view illustrating a method for correcting a coordinate of an electronic pen using a touch hovering according to another embodiment of the present disclosure.

Referring to FIGS. 5 and 6, in operation S501, the controller 180 activates a function of the electronic pen 200. The controller 180 controls each element of the portable electronic device 100 to perform a user function by using the supplied power, receives a function activation signal of the electronic pen 200 from the input unit 120, and the like, and activates the function of the electronic pen 200.

In operation S503, the controller 180 determines whether a touch hovering input is received when an input of the electronic pen 200 has been received. The touch hovering is separated with the hovering state of the electronic pen 200, and indicates that a hand of the user is within a predetermined distance that may be detected from the touch panel 162 before the hand of the user touches the display unit 160 when the user grasps the electronic pen 200 and writes text, and the like. As shown in reference numeral 601, the touch hovering input is formed as an area 610 and may be detected as a coordinate from a plurality of points. The controller 180 may determine a touch hovering input coordinate by comparing an intensity of the hovering at a coordinate of a multiple point in which the hovering is detected. The controller 180 previously defines a predetermined time and may determine whether the touch hovering input is detected within the predetermined time.

When the touch hovering input is not detected in operation S503, the controller 180 may apply either the left-hand or the right-hand grip angle as the coordinate correction angle which is stored in the standard coordinate correction table 172 in operation S505.

When the input of the electronic pen 200 has been received in operation S503, the controller 180 may calculate a coordinate correction angle of the electronic pen 200 from the touch hovering coordinate in operation S507. When the touch hovering is used according to an embodiment of the present disclosure, the coordinate correction angle may be calculated regardless of the arrangement angle and the rotation angle of the portable electronic device 100, differently from the case of face recognition as described above. Even though the portable electronic device 100 rotates at a predetermined angle B in reference numeral 602, a coordinate 104 of the electromagnetic induction point and a determined coordinate 620 of the touch hovering, which are required to calculate a coordinate correction angle C, may be obtained so that the coordinate correction angle C may be calculated.

In reference numeral 602, although an angle formed by the contact point 102 of the electronic pen 200 and the electromagnetic induction point 104 is parallel with an angle formed by the electromagnetic induction point 104 and the coordinate 620 of the touch hovering, this is merely to explain the technical idea of the present disclosure and the scope of the present disclosure is not limited thereto. While the controller 180 may determine the angle C calculated based on the coordinate 104 of the electromagnetic induction point and the coordinate 620 of the touch hovering as the coordinate correction angle, it is also possible to determine the coordinate correction angle by adding or subtracting a predetermined angle obtained through statistics or experiments to the calculated angle C.

In operation S509, the controller 180 may correct the coordinate of the electronic pen 200 by applying the coordinate correcting angle and the standard inclination distance calculated in operation S507, as the coordinate correction distance.

Figure 7:
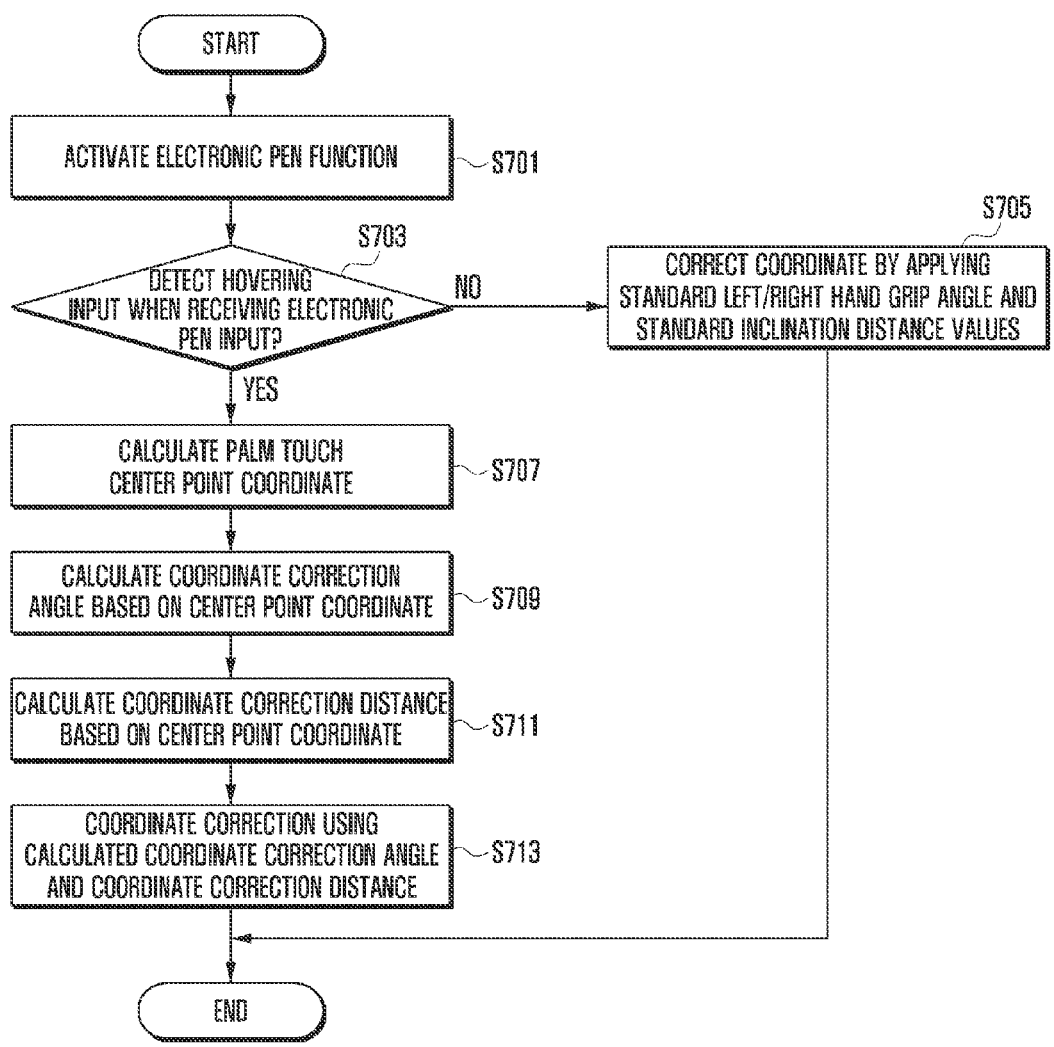
FIG. 7 is a flowchart illustrating a method for correcting a coordinate of an electronic pen using a palm touch according to another embodiment of the present disclosure.
Figure 8:
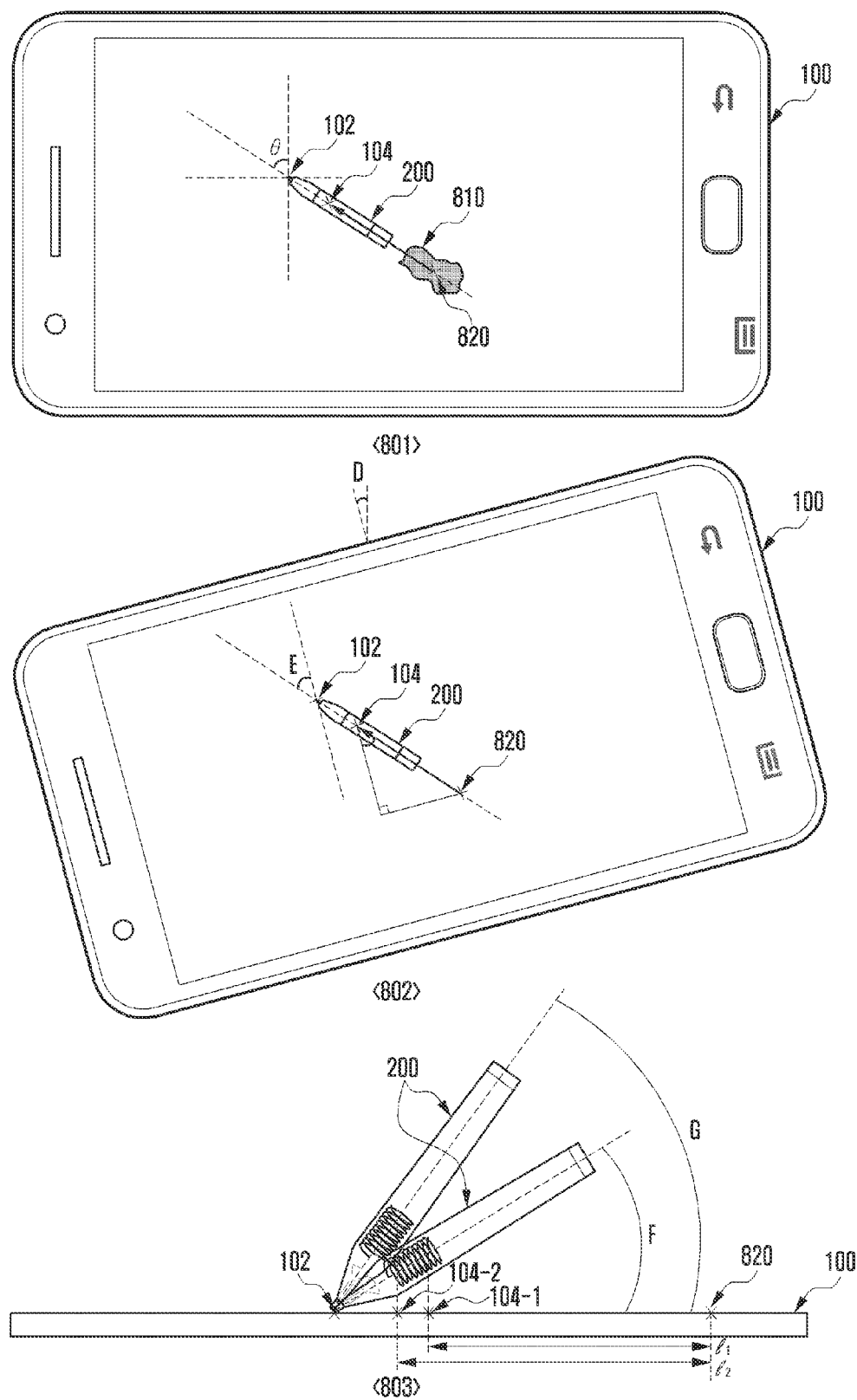
FIG. 8 is a view illustrating a method for correcting a coordinate of an electronic pen using a palm touch according to another embodiment of the present disclosure.

FIG. 7 is a flowchart illustrating a method for correcting a coordinate of an electronic pen using a palm touch according to another embodiment of the present disclosure and FIG. 8 is a view illustrating a method for correcting a coordinate of an electronic pen using a palm touch according to another embodiment of the present disclosure.

Referring to FIG. 7 and FIG. 8, the controller 180 activates a function of the electronic pen 200 in operation S701. The controller 180 controls each element of the portable electronic device 100 to perform a user function by using the supplied power, receives a function activation signal of the electronic pen 200 from the input unit 120, and the like, and activate the function of the electronic pen 200.

In operation S703, the controller 180 determines whether an input of a palm touch is received when the input of the electronic pen 200 has been received. The palm touch refers to a situation where a palm of the user forms a predetermined area and makes contact with the display unit 160. As shown in reference numeral 801, the palm touch input may form an area 810 and may be detected as coordinates of a plurality of points. When the palm touch input has been not received, the controller 180 may correct the coordinate of the electronic pen 200 by using the grip angle of the left-hand and the right-hand and the standard inclination correction distance in operation S705.

When the palm touch input has been received by the controller 180 in operation S703, a coordinate 820 of a center point of the palm touch may be calculated in operation S707. In calculating the coordinate 820 of the center point of the palm touch input, the controller 180 may calculate a vector value corresponding to an average value obtained by averaging vector values of points corresponding to an outline of the palm touch area 810 among coordinates of the plurality of points forming the palm touch area 810, as the center point 820. However, the calculation criteria of the center point 820 is merely an illustrative example of the present disclosure, and the present disclosure is not limited thereto; it is possible to consider various calculation criteria of the center point 820. For example, according to different types of implementing the touch panel 162, a size of a pressure by the contact within the palm touch area or an intensity of the variation of the electrostatic capacity may be measured and a point where the measured size of the pressure or intensity of the capacity is the strongest may be calculated as the center point.

In operation S709, the controller 180 calculates the coordinate correction angle based on the center point 820 of the palm touch calculated through operate 707. A scheme of calculating the coordinate correction angle based on the center point 820 of the palm touch may be identical to a scheme of using the touch hovering as described above. As shown in reference numeral 802, the controller 180 may calculate a coordinate correction angle E based on the coordinate of the electromagnetic induction point 104 and the coordinate of the center point 820 of the palm touch, regardless of the rotation angle of the portable electronic device 100. While reference numerals 801 and 802 illustrate that the angle formed by the contact point 102 of the electronic pen 200 and the electromagnetic induction point 104 is parallel with the angle formed by the electromagnetic induction point 104 and the center point 820 of the palm touch, embodiments of the present disclosure are not limited thereto. The controller 180 may apply the coordinate correction angle by adding and subtracting a predetermined angle obtained by statistics or experiments to the calculated angle E.

In operation S711, the coordinate correction distance based on the coordinate 820 of the center point is calculated. The controller 180 may calculate a distance between the electromagnetic induction point 104 and the center point 820 of the palm touch based on the coordinate of the electromagnetic induction point 104 and the coordinate of the center point 820 of the palm touch, and calculate the coordinate correction distance. The coordinate correction distance may be determined based on a distance corresponding to a distance between the electromagnetic induction point 104 and the calculated center point 820 of the palm touch. In operation S713, the coordinate of the electromagnetic induction point 104 changes (e.g., from point 104-1 to 104-2 or vice versa) according to inclination angles F and G of the electronic pen 200 so that a distance $l_1$ and $l_2$ between the electromagnetic induction point 104 and the center point 820 of the palm touch may be changed. While the center point 820 of the palm touch is illustrated as an identical point regardless of the inclination angle of the electronic pen 200 in operation S713, the coordinate of the center point 820 of the palm touch may be also changed.

However, the inclination angle of the electronic pen 200 relates to a distance between the electromagnetic induction point 104 and the center point 820 of the palm touch. As the inclination angle of the electronic pen 200 is smaller, the distance between the electromagnetic induction point 104 and the center point 820 of the palm touch is bigger. Accordingly, in an embodiment of the present disclosure, the coordinate correction distance may be calculated by using the palm touch table 176 in which a distance corresponding to the distance between the electromagnetic induction point 104 and the center point 820 of the palm touch has previously been defined. In this event, a distance corresponds to the distance between the electromagnetic induction point 104 and the center point 820 of the palm touch in the palm touch table 176 may apply a value acquired through experiments or statistics.

Thus, it is possible to calculate a more accurate coordinate correction angle and coordinate correction distance when the coordinate of the electronic pen 200 is corrected by using the palm touch according to an embodiment of the present disclosure.

Meanwhile, a method for correcting the coordinate of an electronic pen 200 according to an embodiment of the present disclosure may set that a mode using the user image photographed by the camera 140, a mode using the touch hovering input, and a mode using the palm touch input are overlapped. When those modes are overlapped, a priority preference may be set. In this event, the controller 180 may set the priority preference as an order of the mode using the palm touch input, the mode using the touch hovering input, and the mode using the user image photographed by the camera 40. While the mode of correcting the coordinate of the electronic pen 200 by using the palm touch, the coordinate correction angle and the coordinate correction distance may be calculated, the coordinate correction angle is only calculated in the mode using the touch hovering and the mode using the user image photographed by the camera 140 so that a priority may be given in the correction mode of the coordinate of the electronic pen 200 by using the palm touch. In addition, the mode using the touch hovering input may calculate the coordinate correction angle nevertheless separately identifying the arrangement state and the rotation angle of the portable electronic device 100, and it is possible to give the use using the touch hovering input a higher priority level than the mode using the user face image photographed by the camera 140. However, such a setting of the priority preference is merely illustrative, and does not limit the technical idea of the present disclosure.

The portable electronic device 100 may further include various additional modules according to a type of the electronic device. The portable electronic device 100 may further include other unmentioned configurations, such as a near distance communication module for performing near distance communication, an interface for transmitting and receiving data through a wired communication scheme or a wireless communication scheme, an internet communication module for performing an internet function by communicating with the internet network, a digital broadcasting module for performing a reproduction function and a function of digital broadcasting reception, and the like. The elements are not addressed in detail as they are very diversely modified according to a convergence trend of the digital devices. However, elements similar to the elements as described above may be added to the device. Also, with regard to the portable electronic device 100 of the present disclosure, specific configurations may be omitted from the configuration or substituted with other configurations according to the types of the portable electronic device 100. This will be easily understood by those skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums may also be distributed over network coupled computer systems so that the instructions are stored and executed in a distributed fashion. Also, functional computer programs, instructions, and instruction segments for accomplishing the present disclosure may be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for correcting coordinates of a portable electronic device using an electronic pen, the method comprising:
calculating a coordinate correction angle;
calculating a coordinate correction distance from an electromagnetic induction point on a display unit of the portable electronic device, on which an electromagnetic field generated by electromagnetic induction between the coil and a sensor board of the portable electronic device is measured, to a contact point that the electronic pen contacts with the display unit; and
determining a coordinate of the electronic pen based on the calculated coordinate correction angle and the calculated coordinate correction distance,
wherein the calculating of the coordinate correction angle comprises at least one of:
calculating the coordinate correction angle based on an inclination angle of the portable electronic device to the right or left on the basis of a front side of the user based on a user face image and the electromagnetic induction point;
calculating the coordinate correction angle based on a point corresponding to a touch hovering input generated by hovering of a user's hand on the display unit and the electromagnetic induction point; and
calculating the coordinate correction angle based on a point corresponding to a palm touch input generated by a palm touch of the user on the display unit and the electromagnetic induction point.

2. The method of claim 1, wherein the calculating of the coordinate correction angle based on the inclination angle of the portable electronic device to the right or left on the basis of the front side of the user based on the user face image and the electromagnetic induction point comprises:
collecting a user image photographed by a camera;
recognizing a user face included in the collected user image;
extracting a specific coordinate within the recognized user face;
identifying the inclination angle to the right or left based on the specific coordinate and the electromagnetic induction point; and
calculating the coordinate correction angle based on the inclination angle.

3. The method of claim 2, wherein the collecting of the user image photographed by the camera comprises starting photography of the user image by the camera when a hovering of the electronic pen is detected.

4. The method of claim 2, wherein the specific coordinate within the user face is at least one of a coordinate of an eye of the user, a coordinate of a nose of the user and a coordinate of a face shape of the user.

5. The method of claim 1, wherein the calculating of the coordinate correction angle based on the point corresponding to the touch hovering input and the electromagnetic induction point comprises:
detecting the touch hovering input when the electronic pen contacts the display unit; and
calculating the coordinate correction angle based on an angle formed by a linear line passing through the point corresponding to the touch hovering input and the electromagnetic induction point.

6. The method of claim 1, wherein the calculating of the coordinate correction angle based on the point corresponding to the palm touch input and the electromagnetic induction point comprises:
detecting the palm touch input when the electronic pen contacts the display unit;
calculating a center point as a point corresponding to the detected palm touch input on the display unit; and
calculating the coordinate correction angle based on the center point and the electromagnetic induction point,
wherein the calculating of the coordinate correction distance comprises calculating the coordinate correction distance based on a distance between the center point and the electromagnetic induction point.

7. The method of claim 1, further comprising:
determining, when two or more of the user face image, the touch hovering input and the palm touch input are received, a priority preference; and
calculating the coordinate correction angle and the coordinate correction distance based on the priority preference.

8. The method of claim 7, wherein the determining of the priority preference between the two or more inputs comprises determining the priority preference in an order of the palm touch input, the touch hovering input, and the user face image.

9. A portable electronic device comprising:
a sensor board configured to receive a touch hovering input and a touch input from an electronic pen;
a display unit configured to receive a touch hovering input generated by a hovering of a user's hand and a palm touch input generated by a palm touch of the user;
a camera configured to photograph a user's face; and
a controller configured to calculate a coordinate correction distance from an electromagnetic induction point on a display unit, on which an electromagnetic field generated by electromagnetic induction between the coil and the sensor board is measured, to a contact point that the electronic pen contacts with the display unit and to calculate a coordinate correction angle, to determine a coordinate of the electronic pen based on the calculated coordinate correction angle and the calculated coordinate correction distance, and to control the calculation of the coordinate correction angle according to at least one of:
calculating the coordinate correction angle based on an inclination angle of the portable electronic device to the right or left on the basis of a front side of the user based on a user face image and the electromagnetic induction point;
calculating the coordinate correction angle based on a point corresponding to a touch hovering input generated by hovering of a user's hand on the display unit and the electromagnetic induction point; and
calculating the coordinate correction angle based on a point corresponding to a palm touch input generated by a palm touch of the user on the display unit and the electromagnetic induction point.

10. The portable electronic device of claim 9, wherein the controller is configured to control to collect a user image photographed by the camera, to recognize a user face included in the collected user image, to extract a specific coordinate within the recognized face of the user, to identify the inclination angle to the right or left based on the specific coordinate and the electromagnetic induction point, and to calculate the coordinate correction angle based on the inclination angle.

11. The portable electronic device of claim 10, wherein the controller is configured to control the camera to start photography of the user image when the hovering of the user's hand which grasps the electronic pen is detected.

12. The portable electronic device of claim 10, wherein the specific coordinate within the user face is at least one of a coordinate of an eye of the user, a coordinate of a nose of the user, and a coordinate of a face shape of the user.

13. The portable electronic device of claim 9, wherein the controller is configured to detect the touch hovering input when the electronic pen contacts with the display unit and to calculate the coordinate correction angle based on an angle formed by a linear line passing through a point corresponding to the touch hovering input and the electromagnetic induction point.

14. The portable electronic device of in claim 9, wherein the controller is configured to detect the palm touch input when the electronic pen contacts with the display unit, to calculate a center point as a point corresponding to the detected palm touch input on the display unit, to calculate the coordinate correction angle based on the center point and the electromagnetic induction point, to calculate the coordinate correction distance based on a distance between the center point and the electromagnetic induction point, and to calculate the coordinate correction distance based on a distance between the center point and the electromagnetic induction point.

15. The portable electronic device of claim 9, wherein the controller is further configured to determine a priority preference, when two or more of the user face image, the touch hovering input and the palm touch input are inputted, and to calculate the coordinate correction angle and the coordinate correction distance based on the priority preference.

16. The portable electronic device of claim 15, wherein the controller is configured to determine the priority preference in an order of the palm touch input, the touch hovering input, and the user face image.

17. A non-transitory computer-readable storage medium storing instructions that, when executed, cause at least one processor to perform the method of claim 1.

* * * * *